United States Patent
Krishnamurthy et al.

(10) Patent No.: US 9,910,896 B2
(45) Date of Patent: Mar. 6, 2018

(54) SUSPENDING AND RESUMING CONTINUOUS QUERIES OVER DATA STREAMS

(71) Applicant: Cisco Technology, Inc., San Jose, CA (US)

(72) Inventors: Sailesh Krishnamurthy, Palo Alto, CA (US); Chris Metz, Danville, CA (US); Rex E. Fernando, San Jose, CA (US); Jisu Bhattacharya, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 764 days.

(21) Appl. No.: 13/839,148

(22) Filed: Mar. 15, 2013

(65) Prior Publication Data
US 2014/0280325 A1    Sep. 18, 2014

(51) Int. Cl.
    *G06F 17/30* (2006.01)
(52) U.S. Cl.
    CPC .. *G06F 17/30516* (2013.01); *G06F 17/30492* (2013.01); *G06F 17/30545* (2013.01)
(58) Field of Classification Search
    CPC ......... G06F 17/30516; G06F 17/30445; G06F 17/30545; G06F 17/30492
    See application file for complete search history.

(56) References Cited

U.S. PATENT DOCUMENTS

| | | | | |
|---|---|---|---|---|
| 6,397,227 B1 * | 5/2002 | Klein | ............... | G06F 17/30377 |
| 6,654,907 B2 * | 11/2003 | Stanfill | ............... | G06F 11/1458 |
| | | | | 712/221 |
| 7,603,670 B1 * | 10/2009 | van Rietschote | ..... | G06F 9/4856 |
| | | | | 718/1 |
| 7,716,473 B1 * | 5/2010 | Kraemer | ................. | H04L 63/20 |
| | | | | 703/6 |

(Continued)

OTHER PUBLICATIONS

Yali Zhu, Elke A. Rundensteiner and George T. Heineman (2004), "Dynamic Plan Migration for continous queries over Data Streams".*

(Continued)

*Primary Examiner* — Heather Herndon
*Assistant Examiner* — Merilyn Nguyen
(74) *Attorney, Agent, or Firm* — Hickman Palermo Becker Bingham LLP

(57) ABSTRACT

In an embodiment, a method comprises processing an input data stream as the data stream is streamed and producing a derived stream therefrom; storing the input data stream in an input archive; suspending processing of the input data stream; subsequent to suspending processing, resuming processing of the input data stream, wherein resuming comprises: storing newly received data in the input data stream in a buffer, as the input data stream is streamed; determining a first timestamp; determining a second timestamp; searching the input archive to find a data item that matches the first timestamp of the last processed data item; processing data in the input archive having timestamps that are greater than the (Continued)

first timestamp until arriving at data with a third timestamp that is greater than the second timestamp; processing the input data stream from the buffer; continuing processing the input data stream as the input stream is streamed.

22 Claims, 7 Drawing Sheets

(56) References Cited

U.S. PATENT DOCUMENTS

| | | | |
|---|---|---|---|
| 7,979,420 B2* | 7/2011 | Jain | G06F 17/30548 707/713 |
| 8,479,216 B2* | 7/2013 | Lakshmanan | G06F 9/5088 709/201 |
| 8,554,789 B2 | 10/2013 | Agrawal | |
| 8,601,458 B2 | 12/2013 | Andrade | |
| 8,745,070 B2* | 6/2014 | Krishnamurthy | G06F 17/30445 707/751 |
| 2009/0106214 A1* | 4/2009 | Jain | G06F 17/30516 |
| 2010/0082833 A1* | 4/2010 | Masunaga | H04N 7/17318 709/231 |
| 2010/0131745 A1 | 5/2010 | Meijer | |
| 2010/0229178 A1* | 9/2010 | Ito | G06F 9/5083 718/104 |
| 2011/0093500 A1* | 4/2011 | Meyer | G06F 17/30893 707/774 |
| 2011/0167148 A1 | 7/2011 | Bodziony et al. | |
| 2011/0179228 A1 | 7/2011 | Amit | |
| 2011/0314019 A1 | 12/2011 | Jimenez Peris et al. | |
| 2012/0078951 A1* | 3/2012 | Hsu | G06F 17/30445 707/769 |
| 2012/0110042 A1 | 5/2012 | Barsness | |
| 2012/0110599 A1* | 5/2012 | Schoning | G06F 9/542 719/318 |
| 2012/0297249 A1 | 11/2012 | Yang | |
| 2012/0304003 A1* | 11/2012 | Goldstein | G06F 11/1438 714/15 |
| 2014/0032535 A1* | 1/2014 | Singla | G06F 17/30345 707/722 |
| 2014/0379712 A1* | 12/2014 | Lafuente Alvarez | G06F 17/30516 707/736 |
| 2016/0026530 A1 | 1/2016 | Amurthy et al. | |
| 2016/0026663 A1 | 1/2016 | Amurthy et al. | |

OTHER PUBLICATIONS

Shivanth Babu and Jennifer Widom (2001), "Continuous Queries over Data Streams", pp. 109-120.*
Esper Team and Esper Tech Inc., "Esper Reference", version 4.9.0, dated 2006-2012, 712 pages.
Chandramouli et al., "On Suspending and Resuming Dataflows", dated Apr. 15, 2007, 3 pages.
Chandramouli et al., "Query Suspend and Resume", Sigmod, dated 2007, 12 pages.
Chandramouli et al., "Query Suspend and Resume", dated Jun. 11, 2007, 31 pages.
International Searching Authority, Search Report in application No. PCT/US2015/040735, dated Oct. 20, 2015, 10 pages.
European Patent Office, Search Report in application No. PCT/US2015/040734, dated Nov. 3, 2015, 12 pages.
European Claims in application No. PCT/US2015/040734, dated Nov. 2015, 7 pages. Cranor et al., "Gigascope" Proceedings of the 2003 ACM Sigmod International Conference on Management Data, dated Jan. 1, 2003, 23 pages. Claims in application No. PCT/US2015/040735, dated Oct. 2015, 6 pages.
Arasu et al., "The CQL Continuous Query Language: Semantic Foundations and Query Execution", The VLDB Journal dated 2006, 22 pages.
U.S. Appl. No. 14/341,436, filed Jul. 25, 2014, Notice of Allowance, May 12, 2016.
U.S. Appl. No. 14/341,676, filed Jul. 25, 2014, Office Action, dated Sep. 26, 2016.
U.S. Appl. No. 14/341,676, filed Jul. 25, 2014, Final Office Action, dated Apr. 26, 2017.

* cited by examiner

SUSPENDING AND RESUMING CONTINUOUS QUERIES OVER DATA STREAMS

TECHNICAL FIELD

The present disclosure relates to management of computer networks including network management databases relating to analytics. The disclosure relates more specifically to techniques for processing continuous queries of network management data.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Data communication networks may comprise a hierarchy of nodes that may each receive, process, and send unbounded, streaming data. In some cases an input data stream will continue streaming data whether or not a particular node or client is receiving the data. Thus, when a node in the network, which takes data from the input data stream as input, is suspended, intentionally or unintentionally, the node may lose input data while the node is suspended.

Some systems may attempt to suspend the entire system, including the input stream, if a single node is suspended. Subsequently, an administrator may programmatically query for missed data, which may be an extremely time intensive procedure, and then resume the whole system. Furthermore, this method may take so long to process the programmatically queried data, that the still further data in the input stream may be missed.

DETAILED DESCRIPTION

Figure 1:
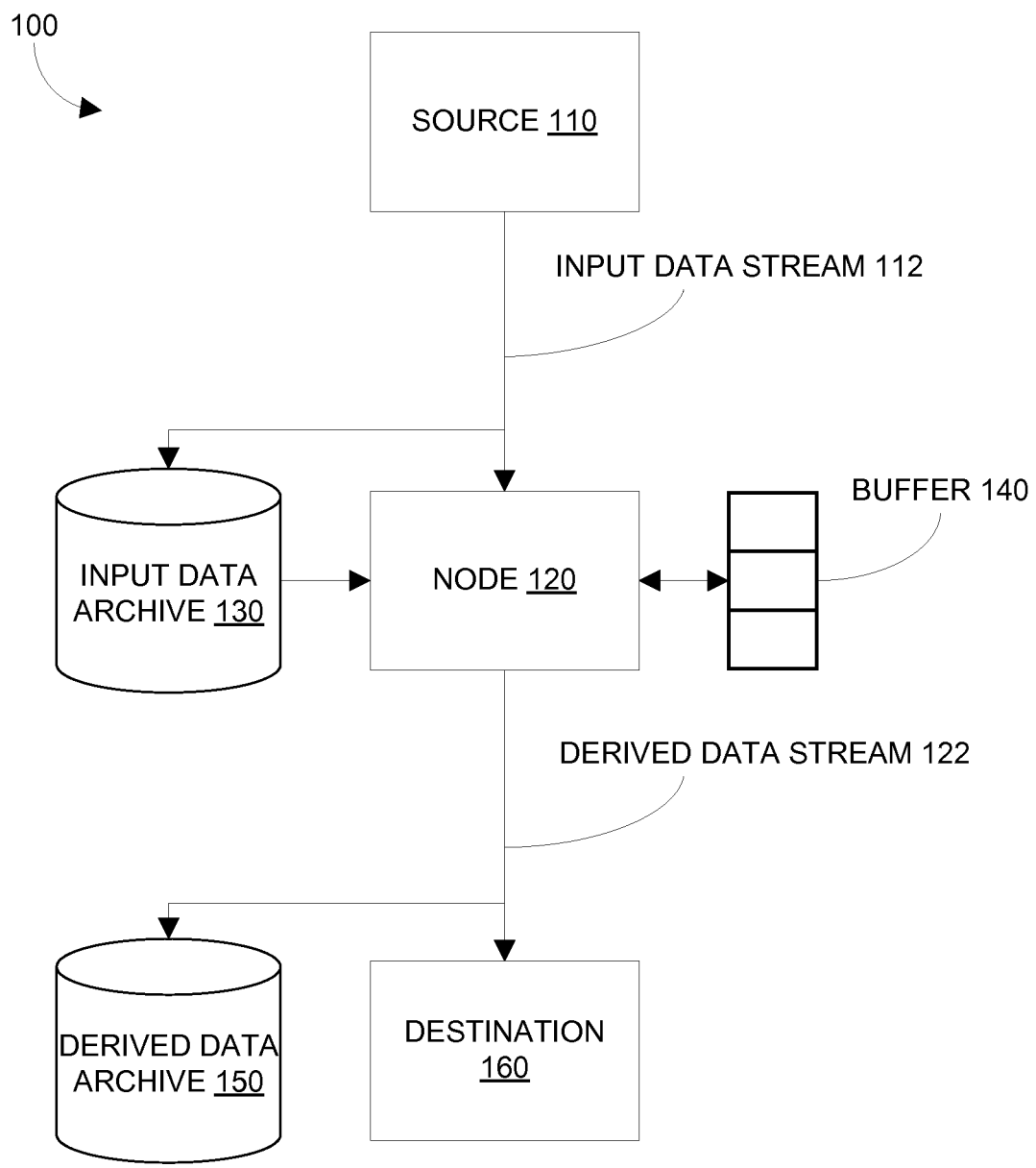
FIG. 1 illustrates a node processing an input data stream and generating a derived data stream, in one example embodiment.

Techniques for suspending and resuming continuous queries over a data stream are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Structural Overview
   4.0 Process Overview
      4.1 Process of Suspending a Node
      4.2 Process of Resuming a Node
   5.0 Example Uses and Embodiments of Processes
   6.0 Implementation Mechanisms—Hardware Overview
   7.0 Extensions and Alternatives

1.0 GENERAL OVERVIEW

In an embodiment, a data processing method comprises processing an input data stream as the data stream is streamed and producing a derived stream therefrom; storing the input data stream in an input archive; suspending processing of the input data stream; subsequent to suspending processing, resuming processing of the input data stream, wherein resuming comprises: storing newly received data in the input data stream in a buffer, as the input data stream is streamed; determining a first timestamp of a last processed data item; determining a second timestamp from the buffered data stream; searching the input archive to find a data item that matches the first timestamp of the last processed data item; processing only particular data in the input archive having timestamps that are greater than the first timestamp until arriving at data with a third timestamp that is greater than the second timestamp; processing the input data stream from the buffer; continuing processing the input data stream as the input stream is streamed. In some embodiments the second timestamp is the least timestamp in the buffer before processing data in the buffer.

In some embodiments, the derived data is stored in a derived data archive. Furthermore, the derived data may be stored in the derived data archive through a series of transactions. The transactions may be initiated based, at least in part, on a window interval defined by a continuous query.

In some embodiments the buffer contains data from the input data stream, beginning from when processing is resumed and ending when data the buffer is finished being processed. Furthermore, as the input data stream from the buffer may be deleted as the input data in the buffer is processed. Thus, the input data in the buffer may be processed until the buffer is empty. Processing the input data stream as the input stream is streamed may resume after processing all data stored in the buffer.

In some embodiments suspending and resuming processing of the input data stream may be automatic. For example, in response to determining an amount of network congestion, processing the input data stream is automatically suspended.

In some embodiments suspending processing of the input data stream also suspends processing of downstream nodes. However, even if suspending processing of the input data stream also suspends processing of downstream nodes, nodes that are not downstream may continue processing and streaming data uninterrupted. Resuming processing of the input data stream may also resume processing of downstream nodes.

In other embodiments, the invention encompasses a computer apparatus and a computer-readable medium configured to carry out the foregoing steps.

2.0 STRUCTURAL AND FUNCTIONAL OVERVIEW

A node, which may be a software module, a device, a computer, or a computer component, that is processing a continuous query, may take an unbounded or indefinite data stream as input and generate an indefinite derived data stream as output. A continuous query is a query for data, including a query against a database, which defines one or more functions to perform on streaming input data. The one or more functions defined by a continuous query may be database specific functions, networking functions, multimedia functions, or any other streaming data functions. For example, a continuous query may specify summarizing, aggregating or filtering network analytics data in a network management application. Furthermore, a continuous query may include a window interval or periodic interval, which may define the frequency at which derived results are sent to subsequent nodes, storage, memory, or other continuous queries. In contrast with a traditional database, where data waits to be queried, a continuous query waits for data to arrive, in order to processes the data, and outputs the derived, processed data. The features and processes discussed herein may be used for various purposes, such as: debugging and diagnostics, recovery from failures, as well as in dynamically and adaptively rebalancing query workloads in order to satisfy priority or communication constraints.

FIG. 1 illustrates a node processing an input data stream and generating a derived data stream, in one example embodiment. While FIG. 1 illustrates one embodiment for purposes of illustrating a clear example, other embodiments may omit, add to, reorder, and/or modify any of the elements shown. In the embodiment illustrated in FIG. 1, system 100 includes source 110, node 120, input data archive 130, buffer 140, derived data archive 150, and destination 160.

Node 120 may be a continuous query that receives input data stream 112 from source 110. Node 120 generates, and streams, derived data stream 122 to destination 160. Node 120 may be a continuous query, a computer, or any other logical module or physical device.

Node 120 may also include buffer 140. Although buffer 140 is distinct and illustrated separately from node 120, buffer 140 may be located on the same computer or machine as node 120. Buffer 140 may merely be memory allocated on the stack or heap executing the node 120. Node 120 need not use buffer 140. For example, Node 120 may be able to process input data stream 112 as fast, or faster, than streaming input data arrives. Alternatively, node 120 may use buffer 140 during routine processing. For example, if node 120 takes longer to process data received from input data stream 112, then node 120 may buffer data as it is received. Buffer 140 may be located in memory, whereas input data archive 130 may be on disk. Thus, node 120 may process the data located in buffer 140 faster than with input data archive 130.

Node 120 may also be a data archiving ("DA") node, such that derived data in derived data stream 122 are stored in derived data archive 150. Additionally or alternatively, node 120 may store derived data stream 122 in derived data archive 150 under limited circumstances. For example, node 120 may store derived data stream 122 in derived data archive when destination 160 unavailable or is no longer connected to node 120.

Source 110 may be a device, database, or any other data generating source, streaming raw data in input data stream 112 to node 120. For example, source 110 may be a router, switch, or other element of internetworking infrastructure, and the input data stream 112 may comprise analytics data relating to packet processing in the network element; one or both of node 120 and destination 160 may comprise a network management station that is configured to analyze the analytics data. Alternatively, source 110 may be another continuous query, or some other type of node, such that input data stream 112 is the derived data generated by source 110. Like Node 120, source 110 may be a DA, such that input data stream 112 is stored in input data archive 130. Although source 110 is distinct and illustrated separately, source 110 may be located on the same device as other modules, e.g. node 120.

Input data archive 130 may store at least a portion of input data stream 112. For example, input data archive 130 may be an external disk that persistently stores data from input data stream 112. Although input data archive 130 is distinct and illustrated separately, input data archive 130 may be located on the same device as other modules, e.g. source 110 or node 120. Additionally or alternatively, input data archive 130 may store a particular amount of the most recent data, store data for a particular amount of time, or store data under certain conditions, e.g., node 120 is not receiving input data stream 112.

Derived data archive 150 may store at least a portion of derived data stream 122. For example, derived data archive 150 may be an external disk that persistently stores data from derived data stream 122. Although derived data archive 150 is distinct and illustrated separately, derived data archive 150 may be located on the same device other modules, e.g. node 120. Additionally or alternatively, derived data archive 150 may store a particular amount of the most recent derived data, store data for a particular amount of time, or store data under certain conditions, e.g., destination 160 is not receiving derived data stream 122.

Destination 160 may be a device, database, or any other module or device receiving derived data stream 122 from node 120. Furthermore, destination 160 may be another continuous query, or some other type of node, such that the derived data stream 122 is the input data for destination 160. Like Node 120, destination 160 may be a DA, such that the output generated by destination 160 is archived. Although destination 160 is distinct and illustrated separately, destination 160 may be located on the same device as other modules, such as node 120.

3.0 STRUCTURAL OVERVIEW

Figure 5:
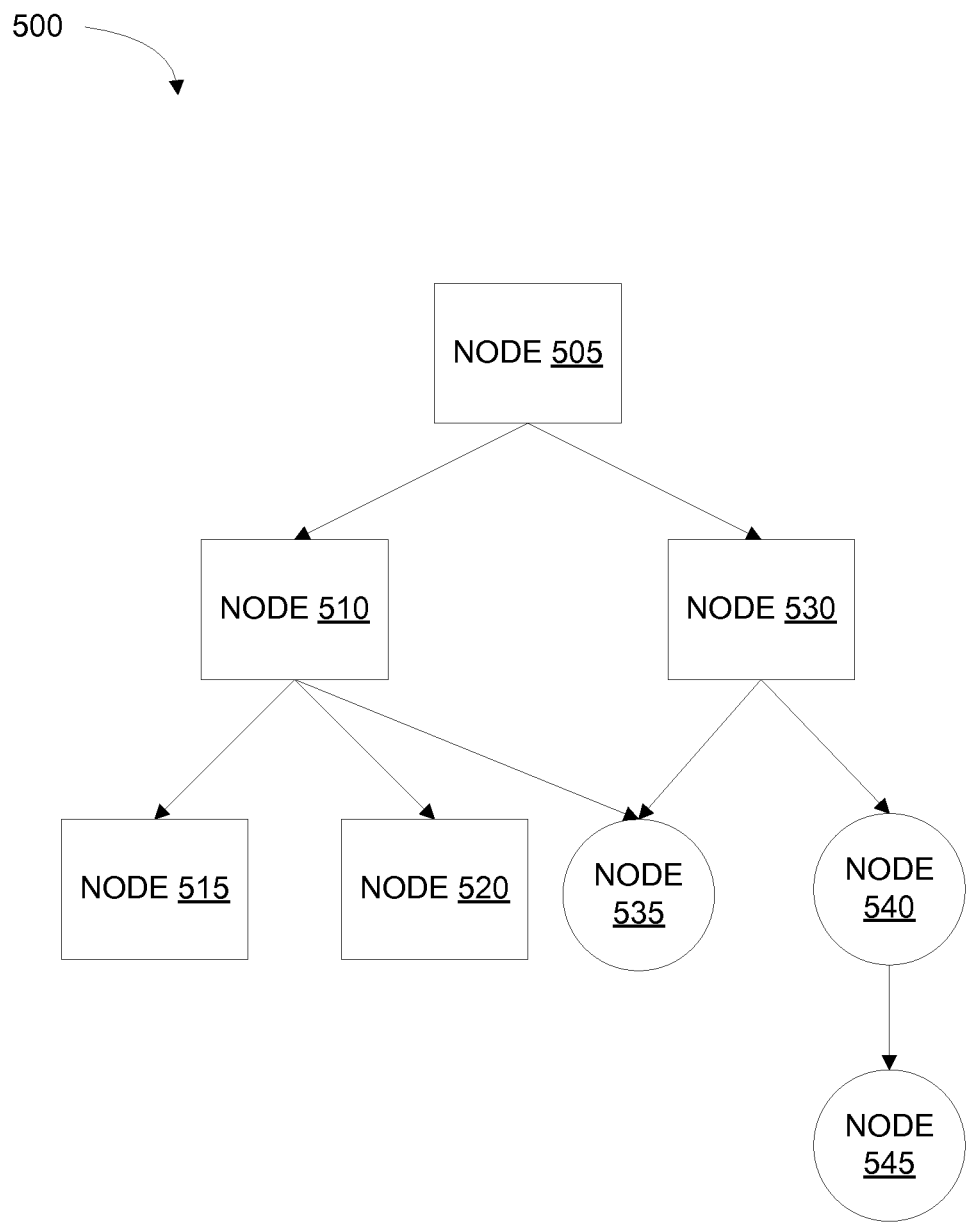
FIG. 5 illustrates a hierarchy of nodes, in one example embodiment.

FIG. 5 illustrates a hierarchy of nodes, in one example embodiment. While FIG. 5 illustrates one embodiment for purposes of illustrating a clear example, other embodiments may omit, add to, reorder, and/or modify any of the elements shown. In the embodiment illustrated in FIG. 5, system 500 includes nodes 505 through 545. Nodes represented as squares denote nodes that are DA nodes, e.g., node 505, node 510, and node 515. Nodes represented as circles denote nodes that are not DA nodes, e.g., node 535, node 540, and node 545.

The arrows connecting the nodes in system 500 denote the direction of data streams. For example, the derived data generated by node 510 is the input data stream for node 515, node 520, and node 535.

DA nodes may be communicatively coupled with a derived data archive, such that the derived data generated by a DA node is stored on the corresponding coupled derived data archive. Archiving data may allow a child node to catch up if suspended. For example, if DA node 510 suspends processing input, then derived data from DA node 505, which may continue to stream data while node 510 is suspended, may be stored on the derived data archive coupled to DA node 505. DA node 510 may subsequently resume processing and catch up by querying the derived data from DA node 505 stored on the archive coupled to DA node 505.

Each node in system 500 may have one or more children. Each node may also have one or more parents. In the embodiment illustrated in FIG. 5 a node may be a DA node if all the parent nodes are DA nodes. For example, node 545 may not be a DA node because it is a child of node 540, which is not a DA node. If node 545 were to suspend processing and subsequently resume processing, there may not be archive for node 545 to query to catch up.

Alternatively, other embodiments may allow a node, which is a child of one or more non-DA nodes, to be a DA node. For example, a rule may specify that suspends node 540 if node 545 is suspended. Accordingly, node 540 may resume processing and catch up by querying the archived derived data associated with node 530, providing the necessary data to node 545 to also catch up.

4.0 PROCESS OVERVIEW

Figure 2:
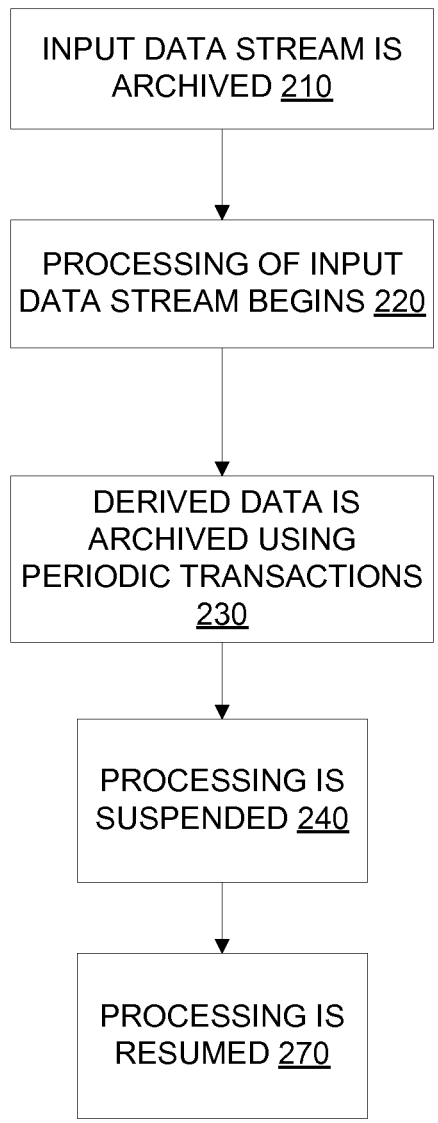
FIG. 2 illustrates a process of archiving, processing, suspending, and resuming a node, in one example embodiment.

FIG. 2 illustrates a process for archiving, processing, suspending, and resuming a node, in one example embodiment. While FIG. 2 illustrates example steps according to an embodiment, other embodiments may omit, add to, reorder, and/or modify any of the steps shown.

For purposes of illustrating a clear example, FIG. 2 may be described using the embodiment illustrated in FIG. 1. However, other embodiments may use other arrangements of nodes, streams, buffers, sources, and destinations. Referring now to FIG. 2, in step 210, the input data stream is archived. For example, source 110 may begin streaming input data stream 112. Input data stream 112 may be a series of data items, each of which may include a timestamp. Input data stream 112 may be stored in input data archive 130 as input data stream 112 is streamed.

In step 220, processing of input data stream begins. For example, node 120 may be a continuous query. Node 120 may receive and process input data stream 112 as the input data arrives.

In step 230, derived data is archived using periodic transactions. For example, node 120 may be a continuous query, which includes an interval parameter, and is instructed to count the records received over five second intervals. As a specific example, assume that node 120 receives tuples through input data stream 112, in the form <A, B> where B is the timestamp. Also, assume that node 120 receives tuples <A1, 2>, <A2, 5>, <A3, 5>, and <A4, 6>. Upon receiving tuple <A4, 6>, node 120 streams <3, 5> in a single transaction, since <A4, 6> belongs to the next period. Accordingly, upon successful completion of the transaction, derived data archive 150 will include <3, 5>.

4.1 Process of Suspending a Node

In step 240, processing is suspended. For example, node 120 may crash, thus halting processing. Alternatively, an application or user may instruct node 120 to suspend processing. Furthermore, a node may be paused in order to debug or update the node. Furthermore, the same processes may be used whether a node is suspended or deleted. Further still, node 120 may be deprioritized and instructed to be suspended. While node 120 is suspended, input data stream 112 is still archived in input data archive 130.

Figure 3:
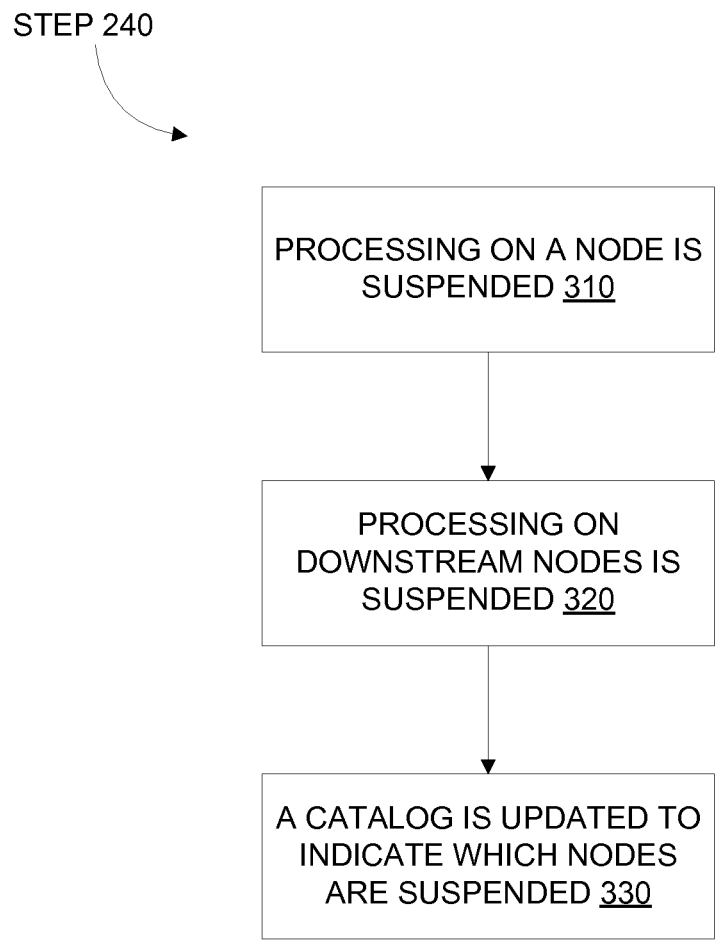
FIG. 3 illustrates a process of suspending processing, in one example embodiment.

FIG. 3 illustrates a more detailed process for suspending processing, in step 240, in one example embodiment. While FIG. 3 illustrates example steps according to an embodiment, other embodiments may omit, add to, reorder, and/or modify any of the steps shown. For purposes of illustrating a clear example, FIG. 3 may be described using the embodiments illustrated in FIG. 1 and FIG. 5. Referring now to FIG. 3, in step 310, processing on a node is suspended. For example, node 120, which for purposes of this example will correspond with node 510, is suspended.

In step 320, processing on downstream nodes is suspended. For example, node 515, node 520, and node 535, each suspend processing. Even though node 535 may still receive input, node 535 stops processing, because further processing may yield incomplete or incorrect results. In other embodiments, node 535 may not suspend processing. For example, in some applications where data is more beneficial if received in real-time, and incomplete data is better than no data, node 535 may be allowed to continue processing.

In step 330, a catalog is updated to indicate which nodes are suspended. For example, a table may be maintained to indicate which nodes are suspended, and which nodes are not. In some embodiments, instead of deleting a node, the catalog may be updated to indicate a suspended status. The catalog may also include the relationships between the nodes. Therefore the catalog may be used to determine which nodes are downstream and should be suspended or resumed. Furthermore, the catalog may keep track of which nodes are DA nodes, and which nodes are not DA nodes. In an embodiment, a process, which monitors the table, also suspends the downstream nodes.

4.2 Process of Resuming a Node

Returning back to FIG. 2, subsequent to step 240, in step 270, processing is resumed. For example, after one or more data items in the input data stream 112 has passed, node 120 may be brought back online or instructed to resume processing. Alternatively, this method could also be used to add a new node.

Figure 4:
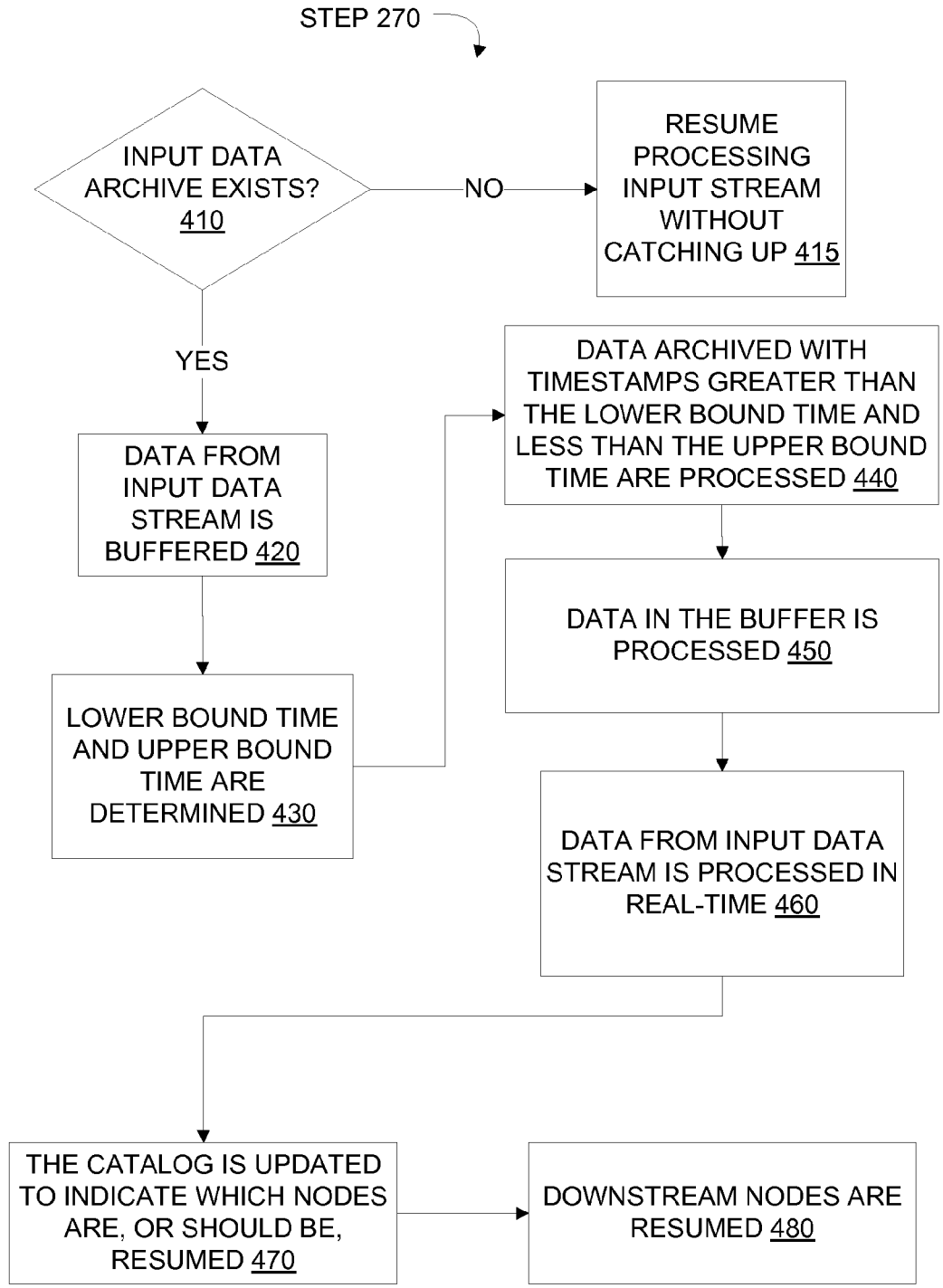
FIG. 4 illustrates a process of resuming processing, in one example embodiment.

FIG. 4 illustrates a more detailed view of a process for resuming processing, in step 270, in one example embodiment. While FIG. 4 illustrates example steps according to an embodiment, other embodiments may omit, add to, reorder, and/or modify any of the steps shown. For purposes of illustrating a clear example, FIG. 4 may be described using the embodiments illustrated in FIG. 1 and FIG. 5. Referring now to FIG. 4, in step 410, control determines whether input data archive exists. If not, then control transitions to step 415, resume processing input stream without catching up. Otherwise, control transitions to step 420. For example, node 120, which for purposes of this example will correspond with node 510, determines that input data archive 130 exists. Accordingly, node 120 proceeds to step 420.

In step 420, data from input data stream is buffered. Since input data stream 112 may not be capable to pause and wait for node 120 to catch up, new data may be buffered while node 120 catches up by processing some of the data stored on disk, as discussed later. Accordingly, in this example, when node 120 is instructed to begin processing, node 120 begins storing input data from input data stream 112 in buffer 140.

In step 430, a lower bound time and an upper bound time are determined. For example, the lower bound time may be the timestamp of the data item node 120 last processed and the upper bound time may be the timestamp of a data item in buffer 140. However, node 120 may have lost state when node 120 was suspended, dropped, or deleted. To restore state, node 120 may process data stored in input data archive 130 with a timestamp greater than the lower bound time, where the lower bound time is the timestamp of the last transaction between node 120 and derived data archive 150 before node 120 was suspended.

Retrieving all the data greater than the lower bound time from input data archive 130 may not be necessary, since data with a timestamp of at least the upper bound time may be stored in buffer 140. In an embodiment, the upper bound time is the second, different timestamp in buffer 140. Assume, for purpose of explanation, that the data in input data stream 112, input data archive 130, and buffer 140, are tuples, e.g. <A, B>, where B is a timestamp. Also, assume that the last three tuples in input data archive 130 are <A1, 13>, <A2, 13> and <A3, 14>; and the first two tuples in buffer 140 are <A2, 13> and <A3, 14>. If the upper bound time is the first timestamp in buffer 140, which is 13, node 120 may query for data from input data archive 130 up to timestamp 13, incorrectly assuming that the first tuple, <A1, 13>, is located in buffer 140. Thus, in this example the upper bound time is the second, different timestamp in buffer 140, which is 14. Tuples stored in buffer 140 with a timestamp less than the upper bound time may be removed. Alternatively, node 120 may not begin storing data in buffer 140 until the upper bound time has been determined.

In step 440, data stored in input data is archived with timestamps greater than the lower bound time and less than the upper bound time are processed. For example, node 120 queries input data archive 130, passing the lower bound time and the upper bound time as parameters. Node 120 may then process the data returned. Alternatively, Node 120 may simply scan input date archive 130 for all data items with a timestamp greater than the lower bound time and less than the upper bound time. Accordingly, at the end of processing the data returned, Node 120 will be caught up to the data stored in buffer 140.

In step 450, data in the buffer is processed. For example, node 120 may treat buffer 140 as a first-in-first-out queue, and process data in the queue until all the data in buffer 140 is processed. Node 120 may still add data received into buffer 140 until node 120 has finished processing all the data in buffer 140. Furthermore, node 120 may delete the data in buffer 140 as node 120 processes the data. Thus, buffer 140 may be empty when node 120 has finished processing the data in buffer 140. When node 120 finishes processing data stored in buffer 140, node 120 may be caught up and ready to resume processing data in real-time as it is received through input data stream 112.

In step 460, data from input data stream is processed in real-time. For example, node 120 resumes processing live data in real-time as it is received through input data stream 112.

In step 470, the catalog is updated to indicate which nodes are, or should be, resumed. For example, the status for node 120 may be updated to indicate that node 120 is processing. Alternatively, step 470 may occur earlier in the resuming process, including before step 410.

In step 480, downstream nodes are resumed. For example, node 120 corresponds to node 510, node 515, node 520, and node 535 may resume processing. Alternatively, step 480 may occur earlier in the resuming process, including before step 410. Furthermore, in an embodiment, a daemon that monitors the catalog may, in response to the status of node 510 changing to indicate that node 510 is processing, initiate the resuming processes for downstream nodes.

5.0 EXAMPLE USES AND EMBODIMENTS OF PROCESSES

Certain embodiments may provide the benefits of greater scalability and more efficient bandwidth utilization. Better scalability may be achieved by pushing the processing of data out to the edge where the data is produced. Efficient bandwidth utilization may be achieved by propagating to the center only summarized or filtered data, which has been processed, and discarding the detailed data at the edge. In some cases, however, collecting the full detailed data in a central node may be desirable. Using the processes discussed above, the full detailed data may be streamed to central nodes during off-peak hours rather than taking up bandwidth during peak hours.

Figure 6:
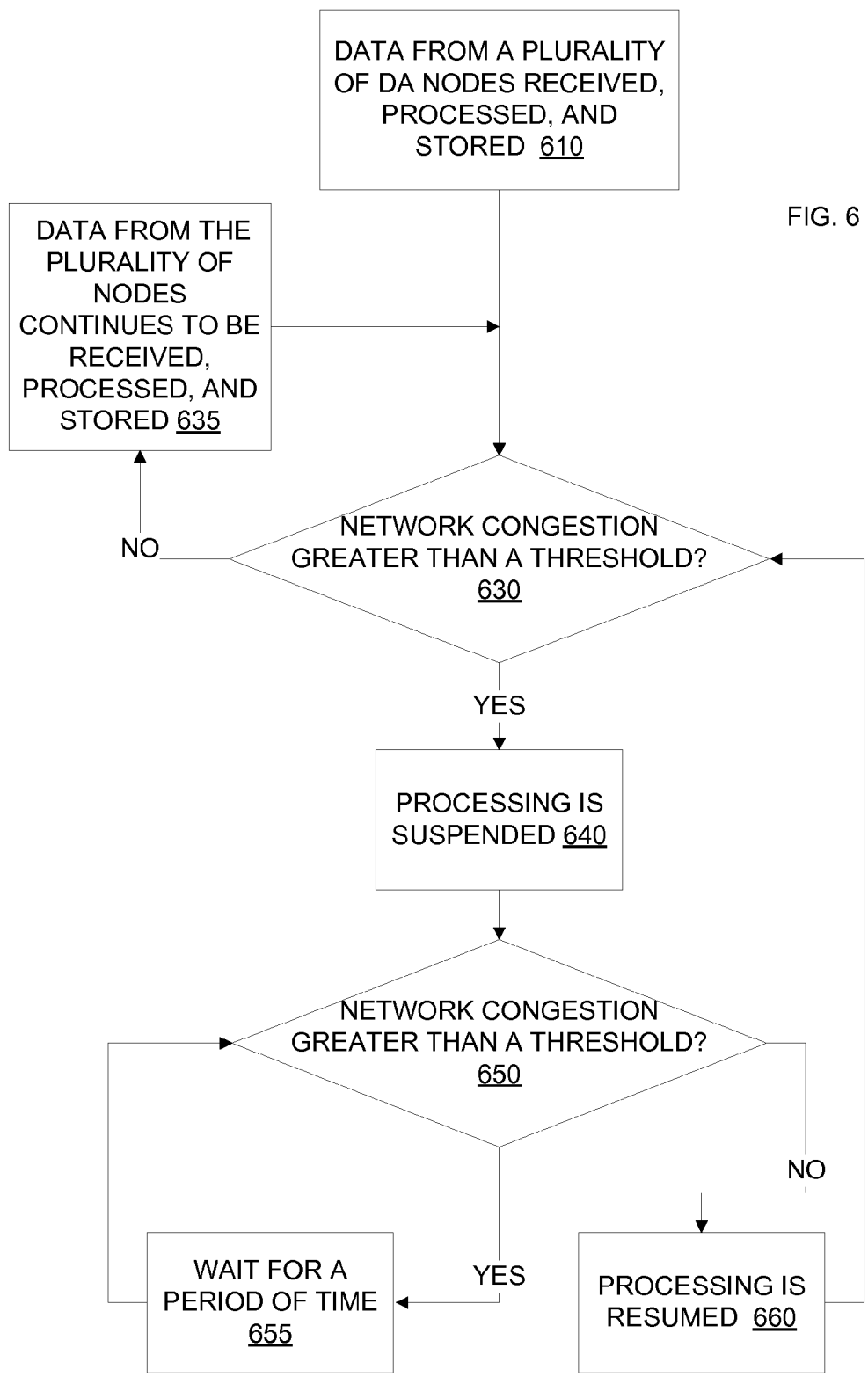
FIG. 6 illustrates a process for adaptively suspending and resuming data across a wide area network, in one example embodiment.

FIG. 6 illustrates a process for adaptively suspending and resuming data across a wide area network, in one example embodiment. While FIG. 6 illustrates example steps according to an embodiment, other embodiments may omit, add to, reorder, and/or modify any of the steps shown.

For purposes of illustrating a clear example, a particular configuration of nodes and streams may be discussed. However, other embodiments may use other arrangements. Referring now to FIG. 6, in step 610, data from a plurality of DA nodes is received, processed, and stored. In an embodiment, the plurality of nodes may be connected to the central node over a wide area network.

In step 630, control determines if network congestion is greater than a threshold. For example, the central node may determine network congestion by monitoring local routing protocol messages, sending one or more echo messages, applying one or more filters to calculated latencies, or any number of methods to measure network congestion, inclusively. If network congestion is greater than a threshold, control proceeds to step 640; otherwise, control proceeds to step 635. In step 635, data from the plurality of nodes continues to be received, processed, and stored.

In step 640, processing is suspended. For example, the central node may be suspended according to FIG. 2, step 240, FIG. 3, steps 310-330. In another embodiment, there are multiple tiers of centralized nodes. Accordingly, a catalog may be maintained of which nodes are being suspended, and which downstream nodes may also be suspended.

In step 650, control determines if network congestion is greater than a threshold, similar to step 630. If so, control proceeds to step 655. If not, control proceeds to step 660. In step 655, control waits for some amount of time; subsequently, control returns to step 650.

In step 660, processing is resumed. For example, referencing steps in FIG. 4, the central node also begins filling a buffer with data from the plurality of DA nodes, step 420. The central node determines a first timestamp, the lower bound time, which is the timestamp of the last transaction in the derived data, first part of step 430. The central node also determines a second timestamp, the upper bound time, based on the data in the buffer, second part of step 430. The central node queries each of the input data archives associated with each of the plurality of DA nodes streaming data to the central node, passing the lower bound time and the upper bound time as parameters, first part of step 440. After the central node receives and processes the queried data, second part of step 440, the central node processes the data stored in the buffer, step 450. After the buffer is empty, the central node begins processing the live streaming data in real-time, step 460. Control may then return step 630.

Alternatively, bandwidth calendaring may be used. For example, if the peak hours are known, a daemon may suspend and resume one or more nodes based on a schedule downloaded by, or submitted to, the daemon. In an embodiment a rule-based schedule is hardcoded, or partially hardcoded, into the daemon. Furthermore, the daemon may be part of the central node, which may also be a master node in a master-slave configuration with other nodes.

In yet another alternative, streaming or processing of lower priority data may be suspended during peak hours and resumed otherwise. For example, some nodes may produce data at different levels of granularity, ranging from raw detailed data, to processed summary data. In an embodiment, the summary data may have a higher priority than the detailed data. Accordingly, the detailed data may be streamed at certain off-peak hours, or when congestion is less than a threshold.

6.0 IMPLEMENTATION MECHANISMS

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
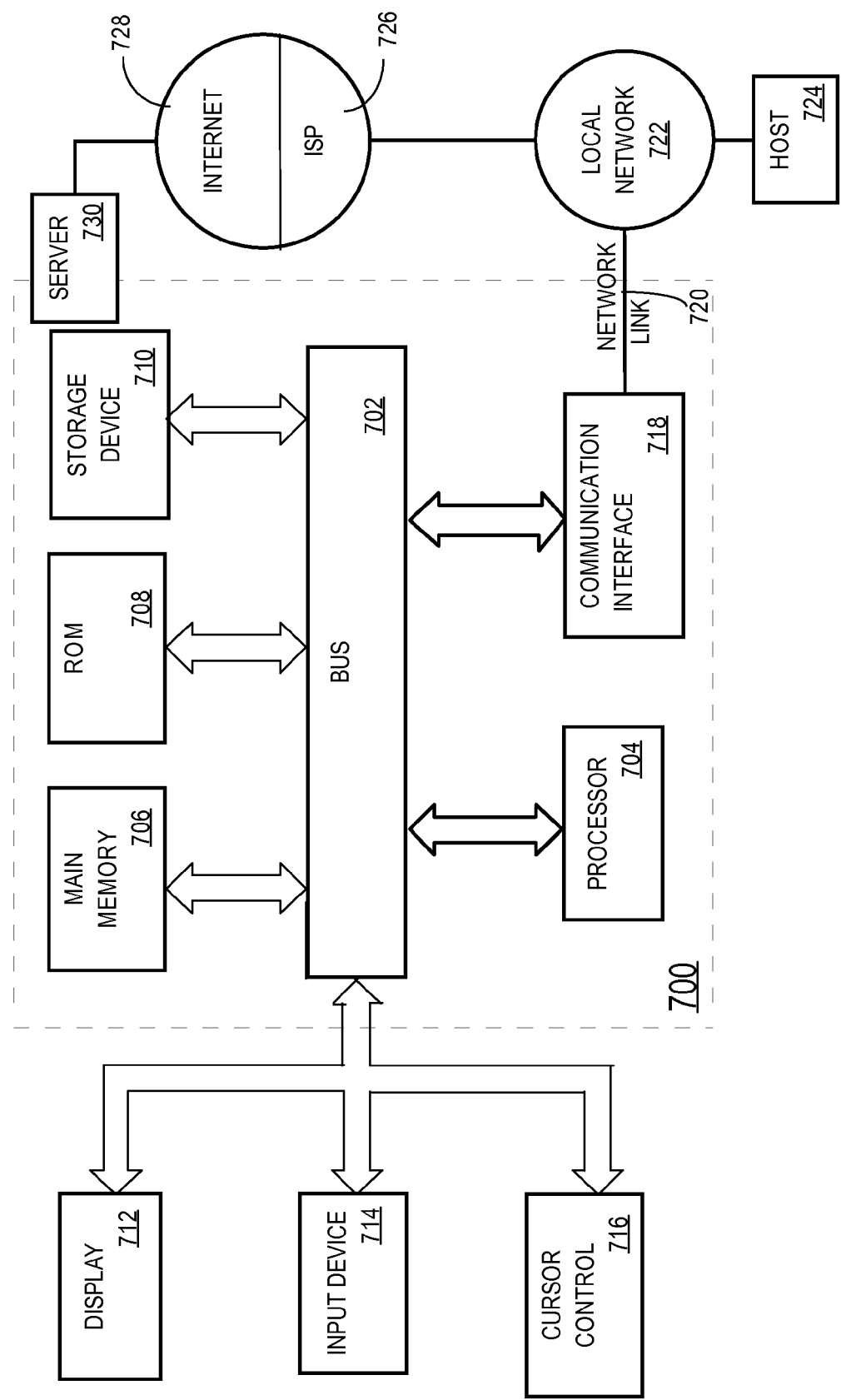
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   processing, using a first node, an input data stream and producing a derived stream therefrom, wherein the first node is a first device;
   sending, using the first node, the derived stream to a second node for processing, wherein the second node is downstream from the first node, and wherein the second node is a second device separate from the first device;
   storing the input data stream in an input archive;
   suspending processing of the input data stream at the first node;
   in response to suspending processing at the first node, suspending processing of the derived stream at the second node; and
   subsequent to suspending processing, resuming processing of the input data stream using the first node and, wherein resuming comprises:
   while resuming, storing newly received data from the input data stream in a buffer, as the input data stream is streamed;
   determining a first timestamp of a last processed data item from the input archive;
   determining, from data stored in the buffer, a second timestamp of a data item in the buffer, wherein the second timestamp comprises a second least timestamp of the data stored in the buffer;
   searching the input archive to find a data item that matches the first timestamp of the last processed data item;
   processing particular data in the input archive having timestamps that are greater than the first timestamp until arriving at data with a third timestamp that is greater than the second timestamp;
   processing the input data stream from the buffer;
   after completing processing the input data stream from the buffer, continuing processing the input data stream as the input data stream is streamed;
   resuming processing of the derived stream at the second node;
   wherein the method is performed by one or more computing devices.

2. The method of claim 1 wherein processing the input data stream comprises processing a continuous query on the input data stream.

3. The method of claim 1 comprising storing the derived data in a derived data archive.

4. The method of claim 3, wherein the derived data is transactionally stored in the derived data archive based, at least in part, on a window interval defined by a continuous query.

5. The method of claim 3 wherein:
   a datum in both the input data stream and the derived stream comprises a timestamp;
   the first timestamp is the greatest timestamp stored in the derived data archive.

6. The method of claim 1 wherein the buffer contains data from the input data stream, beginning from when processing is resumed and ending when data in the buffer is finished being processed.

7. The method of claim 1 wherein processing the input data stream from the buffer comprises removing and processing the input data stream until the buffer is empty.

8. The method of claim 1 wherein processing of the input data stream as the input data stream is streamed continues subsequent to processing all data stored in the buffer.

9. The method of claim 1 wherein the second timestamp is the least timestamp in the buffer before processing data in the buffer.

10. The method of claim 1 comprising:
  determining an amount of network congestion;
  suspending processing automatically based, at least in part, on the amount of network congestion;
  resuming processing automatically based, at least in part, on the amount of network congestion.

11. The method of claim 1 wherein input data stream is any of: raw stream, derived stream.

12. One or more non-transitory computer-readable media storing one or more sequences of instructions which, when executed by one or more computing devices, cause:
  processing, using a first node, an input data and producing a derived stream therefrom, wherein the first node is a first device;
  sending, using the first node, the derived stream to a second node for processing, wherein the second node is downstream from the first node, and wherein the second node is a second device separate from the first device;
  storing the input data stream in an input archive;
  suspending processing of the input data stream at the first node;
  in response to suspending processing at the first node, suspending processing of the derived stream at the second node; and
  subsequent to suspending processing, resuming processing of the input data stream using the first node and, wherein resuming comprises:
  while resuming, storing newly received data from the input data stream in a buffer, as the input data stream is streamed;
  determining a first timestamp of a last processed data item from the input archive;
  determining, from data stored in the buffer, a second timestamp of a data item in the buffer, wherein the second timestamp comprises a second least timestamp of the data stored in the buffer;
  searching the input archive to find a data item that matches the first timestamp of the last processed data item;
  processing particular data in the input archive having timestamps that are greater than the first timestamp until arriving at data with a third timestamp that is greater than the second timestamp;
  processing the input data stream from the buffer;
  after completing processing the input data stream from the buffer, continuing processing the input data stream as the input data stream is streamed;
  resuming processing of the derived stream at the second node.

13. The one or more non-transitory computer-readable media of claim 12 wherein processing the input data stream comprises processing a continuous query on the input data stream.

14. The one or more non-transitory computer-readable media of claim 12 comprising storing the derived data in a derived data archive.

15. The one or more non-transitory computer-readable media of claim 14, wherein the derived data is transactionally stored in the derived data archive based, at least in part, on a window interval defined by a continuous query.

16. The one or more non-transitory computer-readable media of claim 14 wherein:
  a datum in both the input data stream and the derived stream comprises a timestamp;
  the first timestamp is the greatest timestamp stored in the derived data archive.

17. The one or more non-transitory computer-readable media of claim 12 wherein the buffer contains data from the input data stream, beginning from when processing is resumed and ending when data the buffer is finished being processed.

18. The one or more non-transitory computer-readable media of claim 12 wherein processing the input data stream from the buffer comprises removing and processing the input data stream until the buffer is empty.

19. The one or more non-transitory computer-readable media of claim 12 wherein processing of the input data stream as the input data stream is streamed continues subsequent to processing all data stored in the buffer.

20. The one or more non-transitory computer-readable media of claim 12 wherein the second timestamp is the least timestamp in the buffer before processing data in the buffer.

21. The one or more non-transitory computer-readable media of claim 12 comprising:
  determining an amount of network congestion;
  suspending processing automatically based, at least in part, on the amount of network congestion;
  resuming processing automatically based, at least in part, on the amount of network congestion.

22. The one or more non-transitory computer-readable media of claim 12 wherein input data stream is any of: raw stream, derived stream.

* * * * *

UNITED STATES PATENT AND TRADEMARK OFFICE
CERTIFICATE OF CORRECTION

PATENT NO. : 9,910,896 B2  
APPLICATION NO. : 13/839148  
DATED : March 6, 2018  
INVENTOR(S) : Sailesh Krishnamurthy et al.

Page 1 of 1

It is certified that error appears in the above-identified patent and that said Letters Patent is hereby corrected as shown below:

On the Title Page

Item (72) as 5th inventor Column 1, add inventor Madhu Kumar, San Jose, CA.

Signed and Sealed this
Twenty-sixth Day of November, 2019

Andrei Iancu
*Director of the United States Patent and Trademark Office*